May 9, 1939. G. R. PURIFOY 2,157,917
CONTROL SYSTEM
Filed Nov. 24, 1937
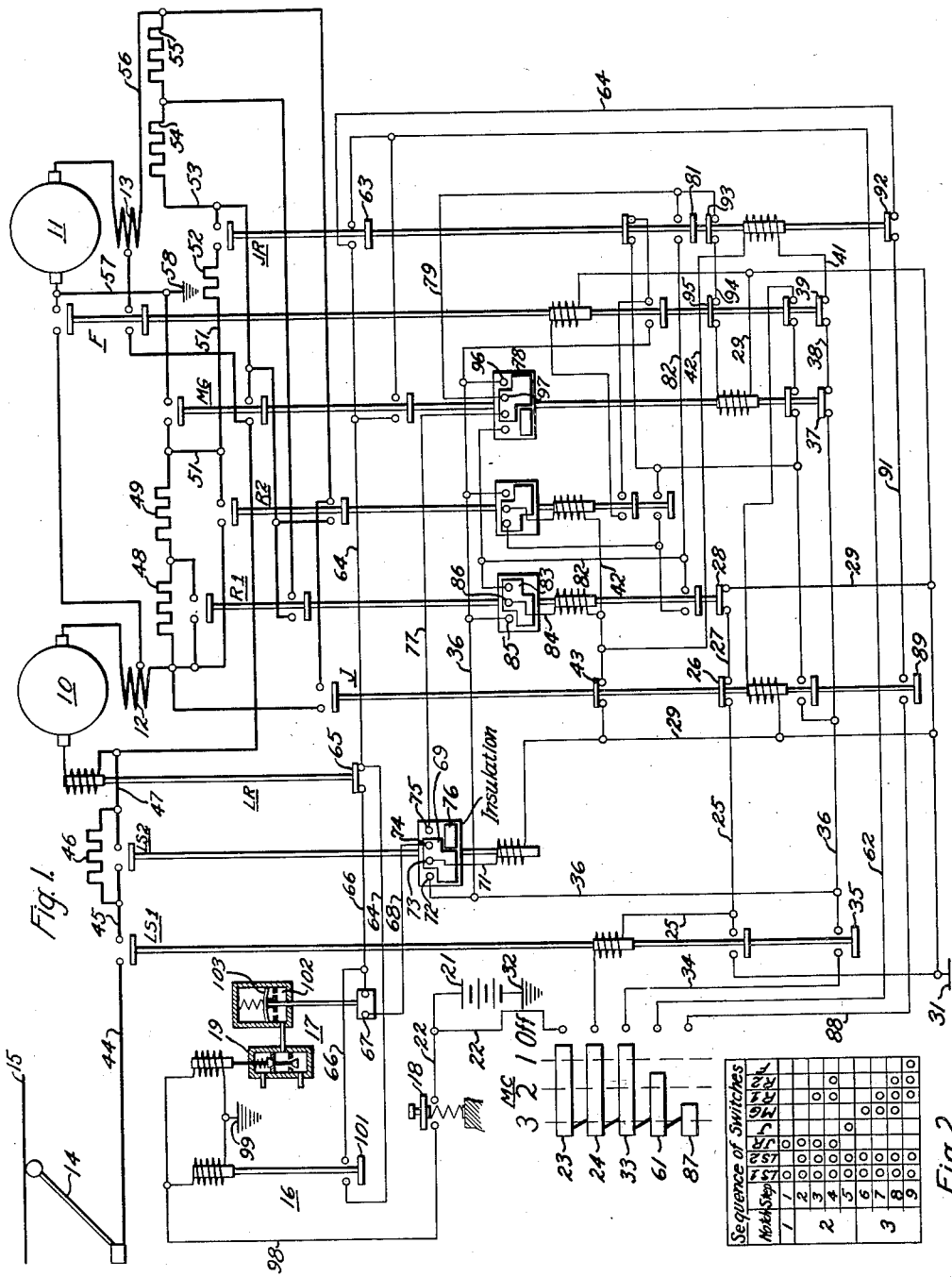
WITNESSES:
C. F. Oberheim
INVENTOR
George R. Purifoy.
BY
ATTORNEY Patented May 9, 1939

2,157,917

UNITED STATES PATENT OFFICE 2,157,917

CONTROL SYSTEM

George R. Purifoy, Wilkinsburg, Pa., assignor to Westinghouse Electric & Manufacturing Company, East Pittsburgh, Pa., a corporation of Pennsylvania Application November 24, 1937, Serial No. 176,236

4 Claims. (Cl. 172—179)

My invention relates, generally, to control systems and, more particularly, to systems for controlling the operation of the propelling motors of electric vehicles.

The automatic acceleration of electrically propelled vehicles is usually controlled by a current limit relay which is set to provide the desired rate of acceleration under normal load conditions. However, under abnormal conditions, such as when the vehicle is required to start on an excessive grade or to pull a trailer car, it is desirable to provide for temporarily removing control of the acceleration of the car from the limit relay and permit the operator to obtain hand notching or step-by-step progression of the accelerating equipment.

Accordingly, an object of my invention is to provide for obtaining manually controlled step-by-step progression of an automatic accelerating equipment.

Another object of my invention is to prevent an automatic accelerating equipment from progressing more than one step at a time while under the manual control of the operator.

A further object of my invention is to provide for the hand notching of an automatic accelerating system of the interlock progression type.

Other objects of the invention will be explained fully hereinafter or will be apparent to those skilled in the art.

In accordance with one embodiment of my invention, relatively simple and inexpensive equipment is so incorporated in an automatic accelerating system of the interlock progression type that the progression can be advanced one step at a time by the operator independently of the current limit relay. However, it is necessary for the operator to definitely release the manual control after each step before the next step can be obtained, thereby preventing the progression from advancing automatically to cause an overload condition.

For a fuller understanding of the nature and objects of the invention, reference may be had to the following detailed description, taken in conjunction with the accompanying drawing, in which:

Figure 1 is a diagrammatic view of a control system embodying the invention, and Fig. 2 is a chart showing the sequence of operation of a portion of the apparatus illustrated in Fig. 1.

Referring to the drawing, the system shown comprises motors 10 and 11, which may be of a type suitable for propelling a vehicle (not shown); line switches LS1 and LS2; accelerating switches R1 and R2 for shunting resistance from the motor circuit to cause the motors to accelerate the vehicle in the usual manner; a switch JR for connecting the motors in series circuit relation; a switch J which is closed during transition from series to parallel-circuit relation; a field shunting switch F for shunting a portion of the series field windings 12 and 13 of the motors 10 and 11, respectively, to cause the motors to operate at maximum speed; the usual current limit relay LR for automatically controlling the operation of the accelerating switches, and a controller MC which may be of the drum type suitable for controlling the operation of the line switch LS1, the series switch JR and the parallel switch MG and also for initiating the operation of the accelerating switches, the sequence of operation of which is controlled by interlock progression in a manner well known in the art.

The power for operating the motors 10 and 11 is supplied through a current collecting device 14 which engages a power conductor 15 that may be energized from any suitable source of power, such as a power generating station (not shown). Under normal conditions, the motors are connected to the power source by the closing of the switch LS1 and the switch JR to connect the motors in series circuit relation. The motors are accelerated by the closing of the switches LS2, R1 and R2 which are closed in sequential relation under the control of the limit relay LR, the sequence of operation being governed by interlock contact members actuated by the accelerating switches. The limit relay LR is adjusted so that the desired accelerating rate will be maintained for normal load conditions.

However, as explained hereinbefore, it is sometimes necessary to temporarily increase the current supplied to the motors during the accelerating period in order that the vehicle can accelerate properly under abnormal conditions, as, for example, when the car is required to start on an excessive grade or when the motors are required to propel an excessive load, such as a trailer car.

In order to remove the control of the acceleration of the car from the limit relay LR and place it under the control of the operator of the vehicle, thereby enabling him to meet the aforesaid emergency conditions, I have provided an electromagnetic relay 16, the contact members of which are disposed to shunt the contact members of the limit relay LR, an electro-pneumatic switch 17, and a manually operable push button 18 for simultaneously controlling the energization of the electromagnetic relay 16 and a magnetic valve 19 which, in turn, controls the operation of the electro-pneumatic device 17.

The foregoing equipment may be so incorporated in a control system of the interlock progression type, such as herein illustrated, that a step-by-step operation of the accelerating switches may be obtained by the operator independently of the limit relay LR, thereby permitting the operator to increase the motor current above the value normally permitted by the limit relay during the accelerating period. However, in order to prevent the motor current from increasing to a value which would operate the overload protective devices usually supplied on electrically propelled vehicles, the equipment is so devised that it is necessary for the operator to release the push button 18 after each step of acceleration and again operate the push button 18 to obtain the next step.

In order that the functioning of the foregoing equipment may be more clearly understood, the operation of the system will now be described in more detail. The operation of the system in the usual manner under normal conditions will be described first, after which the operation under abnormal conditions will be described.

Assuming that it is desired to connect the motors to the power source to accelerate the vehicle in the usual manner, the controller MC is actuated to position "3" which causes the motors to be connected first in series-circuit relation and then in parallel-circuit relation.

As indicated in the sequence chart shown in Fig. 2, the switch LS1 is closed first, followed by the switch JR. The energizing circuit for the actuating part of the switch LS1 may be traced from the positive terminal of a battery 21, which may be utilized for supplying the power for operating the control equipment on the vehicle, through conductor 22, contact segments 23 and 24 on the controller MC, the actuating coil of the switch LS1, conductor 25, an interlock 26 on the switch J, conductor 27, an interlock 28 on the switch R1 and conductor 29, which is grounded at 31, thereby completing the circuit to the battery 21, the negative terminal of which is grounded at 32.

Following the closing of the switch LS1, the actuating coil of the switch JR is energized through a circuit which extends from a contact segment 33 on the master controller MC through conductor 34, an interlock 35 on the switch LS1, conductor 36, interlock 37 on the switch MG, conductor 38, interlock 39 on the switch F, conductor 41, the actuating coil of switch JR, conductor 42, and an interlock 43 on the switch J to the grounded conductor 29.

The motors 10 and 11 are now connected to the power source in series-circuit relation. The motor circuit extending from the power conductor 15 through the current collector 14, a conductor 44, the switch LS1, conductor 45, a resistor 46, conductor 47, the actuating coil of the limit relay LR, the armature winding of the motor 10, the series field winding 12, resistors 48 and 49, conductor 51, a resistor 52, the switch JR, conductor 53, resistors 54 and 55, conductor 56, the series field winding 13 and the armature of the motor 11, and conductor 57 to ground at 58.

When power is applied to the motors in the foregoing manner, the current usually rises to a value which operates the limit relay LR. However, as soon as the motors have attained sufficient speed to cause the counter-electromotive force developed by the motors to reduce the current to a value which permits the limit relay LR to drop to its lowermost position, the switch LS2 is closed to shunt the resistor 46 from the motor circuit. The energizing circuit for the actuating coil of the switch LS2 may be traced from a contact segment 61 on the controller MC through conductor 62, an interlock 63 on the switch JR, conductor 64, the contact members 65 of the limit relay LR, conductor 66, contact members 67 of the electro-pneumatic device 17, conductor 68, an interlock 69 on the switch LS2, conductor 71 and the actuating coil of the switch LS2 to the grounded conductor 29.

When the switch LS2 is actuated to the closed position, a holding circuit is established for the actuating coil of the switch which extends from the previously energized conductor 36 through contact fingers 72 and 73, bridged by the interlock member 69, thence through the conductor 71 to the actuating coil of the switch LS2.

When the switch LS2 is closed to shunt the resistor 36 from the motor circuit, the limit relay is again operated by the increase in the motor current. However, under normal conditions, the motors will increase in speed, thereby causing the current to decrease and permit the relay to close to cause the accelerating switch R1 to be closed to shunt the resistor 48 from the motor circuit. The energizing circuit for the actuating coil of the switch R1 may be traced from the conductor 68, which is energized by the closing of the relay LR in the manner hereinbefore described, through contact members 74 and 75, bridged by an interlocking segment 76 on the switch LS2, conductor 77, interlock segment 78 on the switch MG, conductor 79, an interlock 81 on the switch JR, conductor 82, an interlock 83 on the switch R1, conductor 84, the actuating coil of the switch R1, conductor 42 and the interlock 43 on the switch J to the grounded conductor 29.

A holding circuit for the actuating coil of the switch R1 is established in the usual manner by the closing of the switch. The holding circuit extends from the previously energized conductor 36, through contact members 85 and 86, which are bridged by the segment 83 when the switch is in the closed position, thence through conductor 84 to the actuating coil of the switch.

Following the closing of the switch R1 which shunts the resistors 48 and 54 from the motor circuit, the switch R2 is closed to shunt the resistors 49 and 55 from the circuit for the motors 10 and 11. Since the energizing circuit for the actuating coil of the switch R2 is established by interlock progression in the same manner as explained for the switch R1, it is believed to be unnecessary to describe the operation of this switch in detail. Likewise, the switch J is closed to shunt the resistor 52, following the closing of the switch R2. The operation of the switch J is controlled by interlock progression in the manner hereinbefore explained.

As indicated in the sequence chart shown in Fig. 2, the switches JR, R1 and R2 are opened by the closing of the switch J, thereby causing these switches to be in the proper position for the first step of parallel operation of the motors. It will be noted that the motors are now connected in series-circuit relation directly to the power source, all resistance being shunted from the motor-circuit by the switch J.

Since it has been assumed that the controller

MC is in position "3", the switch MG will be closed next to connect the motors in parallel-circuit relation. The energizing circuit for the actuating coil of the switch MG may be traced from a contact segment 87 on the controller MC through conductor 88, interlock 89 on the switch J, conductor 91, interlock 92 on the switch JR, conductor 64, the contact member 65 of the relay LR, conductor 66, the contact member 67 of the electro-pneumatic device 17, conductor 68, the contact segment 76 on the switch LS2, conductor 77, contact segment 78 on the switch MG, conductor 79, interlock 93 on the switch JR, conductor 94, an interlock 95 on the switch F and the actuating coil of the switch MG to the grounded conductor 29.

A holding circuit for the coil 29 is established by the closing of the switch. The holding circuit extends from the previously energized conductor 36 through contact members 96 and 97, which are now bridged by the segment 78 and thence through conductor 79 to the actuating coil of the switch MG through a circuit previously traced.

The switches R1 and R2 are again closed in sequential relation by interlock progression in the manner previously described. Following the closing of the switch R2, the switch F is closed in a similar manner to shunt a portion of the field windings 12 and 13 from the motor circuits, thereby causing the motors to operate at maximum speed by reducing the field strength of the motors, as is well known in the art.

From the foregoing description, it will be seen that the operation of the accelerating switches in the manner described is normally under the control of the limit relay LR which must drop to its lowermost position before the next step in the progression of the switches can be taken. In this manner, the motor current is limited to a value which will give the desired acceleration of the vehicle under normal operating conditions.

However, as explained hereinbefore, it is desirable to permit the operator to increase the motor current temporarily in order that the vehicle can be accelerated under abnormal conditions. With this purpose in view, I have provided the electro-magnetic relay 16 and the electro-pneumatic device 17, which are controlled by the manually operated push button 18 to permit the operator to cause the operation of the accelerating switches one at a time independently of the relay LR.

Assuming that the switch LS1 has been closed in the usual manner to connect the motors to the power source and the limit relay LR has operated to prevent the closing of the switch LS2 in the usual manner, and that the operator desires to close the switch LS2 independently of the operation of the relay LR, the push button switch 18 may be closed to establish an energizing circuit for the actuating coil of the relay 16. This circuit extends from the battery 21 through conductor 22, the push button switch 18, conductor 98, and the actuating coil of relay 16 to ground at 99.

As shown, the closing of the relay 16 establishes a shunt circuit around the contact members of the relay LR, which extends from the conductor 64 through contact members 101 of the relay 16 to the conductor 66. The establishing of this shunt circuit permits current to flow through the contact member 67 on the electro-pneumatic device 17 and thence through the interlocks on the switch LS2 to the actuating coil of the switch in the manner hereinbefore described, which causes the switch LS2 to start to close. At the same time that the electromagnetic relay 16 is energized, the actuating coil of the magnet valve 19 is also energized. The energization of the magnet valve 19 causes a pressure fluid to be admitted to a cylinder 102 of the electropneumatic device 17 to operate a piston 103 which, in turn, starts moving the contact segment 67 of the device 17.

As explained hereinbefore, a holding circuit is established for the actuating coil of the switch LS2 shortly after the switch begins to travel towards its closed position. Therefore, the contact segment 67 on the device 17 may be so constructed that the circuit through this segment will not be interrupted until after the holding circuit for the actuating coil of the switch LS2 is established, which permits the switch LS2 to be closed in the normal manner.

However, the circuit through the segment 67 is interrupted before the circuit through the contact segment 76, carried by the switch LS2, is established to energize the actuating coil of the switch R1 which is the next one in the progression. Therefore, the push button switch 18 must be released to deenergize the electromagnetic relay 16 and the electro-pneumatic device 17 before the next step in the progression can be obtained.

If the limit relay has dropped to its lowermost position, the next step or succeeding steps will be obtained in the regular manner, but if the limit relay is still in its uppermost position, the next step and the succeeding steps may be obtained by closing the push button switch 18 for each step in the manner hereinbefore described.

It will be understood that the operator can assume control of the operation of the accelerating switches in the manner explained at any stage of the progression of the switches. However, the push button switch 18 must be released after each step is taken before the next step can be obtained, thereby preventing the accelerating switches from being closed in such rapid succession that the motors 10 and 11 become dangerously overloaded or the overload protective equipment is caused to function.

From the foregoing description, it is apparent that I have provided a control system which permits the operator of the vehicle to remove the control of the vehicle temporarily from the limit relay, thereby permitting the car to be accelerated under abnormal conditions or to be accelerated at a higher rate than usual under normal load conditions. It is further apparent that the system herein described may be readily incorporated in an automatic accelerating system of the interlock progression type in which the operation of each succeeding switch in the progression is controlled by a preceding switch in the progression.

I do not desire to be restricted to the particular form or arrangement of parts herein shown and described, since it is evident that they may be changed and modified without departing from the spirit and scope of my invention as defined in the appended claims.

I claim as my invention:

1. In a control system for vehicle motors, in combination, a plurality of accelerating switches, interlocking means actuated by said switches for controlling their sequence of operation, a current limit relay for normally controlling the operation of said switches, manually controlled means for effecting the operation of said switches independently of said limit relay to accelerate the vehicle, and means associated with said manually controlled means but operating independently thereof for stopping the progression of the accelerating switches after each step of acceleration.

2. In a control system for vehicle motors, in combination, a plurality of accelerating switches, interlocking means actuated by said switches for controlling their sequence of operation, a relay responsive to the motor current for normally controlling the operation of said switches, a manually controlled relay for effecting the operation of said switches independently of said current responsive relay, and means associated with the manually controlled relay but operating independently thereof for limiting the progression of the accelerating switches.

3. In a control system for vehicle motors, in combination, a plurality of accelerating switches, interlocking means actuated by said switches for controlling their sequence of operation, a relay responsive to the motor current for normally controlling the operation of said switches, a manually controlled relay for effecting the operation of said switches independently of said current responsive relay, and electro-pneumatic means associated with the manually controlled relay but operating independently thereof for stopping the progression of the accelerating switches after each step of acceleration.

4. In a control system for vehicle motors, in combination, a plurality of accelerating switches, interlocking means actuated by said switches for controlling their sequence of operation, a relay responsive to the motor current for normally controlling the operation of said switches, a manually controlled relay for effecting the operation of said switches independently of said current responsive relay, electro-pneumatic means associated with the manually controlled relay but operating independently thereof for stopping the progression of the accelerating switches after each step of acceleration, and manually operable means for simultaneously energizing the electro-pneumatic means and the manually controlled relay.

GEORGE R. PURIFOY.